United States Patent [19]
Kim et al.

[11] Patent Number: 6,081,082
[45] Date of Patent: Jun. 27, 2000

[54] ROTATABLE INVERTER

[75] Inventors: Chul Kim, Anyang; Yong-woon Han, Kunpo; Seong-deog Jang, Suwon; Han-jun Sung, Seoul, all of Rep. of Korea

[73] Assignee: Samsung Electronics Co., Ltd., Suwon, Rep. of Korea

[21] Appl. No.: 09/226,223

[22] Filed: Jan. 7, 1999

[30] Foreign Application Priority Data

| May 12, 1998 | [KR] | Rep. of Korea | 98-17024 |
| May 22, 1998 | [KR] | Rep. of Korea | 98-18589 |
| Jun. 8, 1998 | [KR] | Rep. of Korea | 98-21117 |
| Jun. 8, 1998 | [KR] | Rep. of Korea | 98-21118 |
| Aug. 29, 1998 | [KR] | Rep. of Korea | 98-35377 |

[51] Int. Cl.$^7$ ........................ H02P 5/00
[52] U.S. Cl. .................... 318/140; 318/154; 318/159; 363/109; 310/59; 310/129
[58] Field of Search .................. 318/138, 139, 318/245, 254, 280–293, 430–434, 140–159; 363/109, 41, 128, 136; 310/59, 129; 60/424, 426, 435; 416/244 R, 169 A; 415/174.2, 213.1; 361/91, 56, 118; 322/86, 24; 321/29

[56] References Cited

U.S. PATENT DOCUMENTS

| 2,038,187 | 4/1936 | McNeil . | |
| 2,220,897 | 11/1940 | Fowler . | |
| 3,573,578 | 4/1971 | Shibata | 318/185 |
| 3,601,622 | 8/1971 | Waaben | 307/136 |
| 3,629,688 | 12/1971 | Fink | 321/50 |
| 3,660,739 | 5/1972 | Okuyama et al. | 318/227 |
| 3,858,107 | 12/1974 | Yarrow et al. | 322/26 |
| 3,868,550 | 2/1975 | Knauer et al. | 317/11 B |
| 4,002,947 | 1/1977 | Holtzman | 317/12 A |
| 4,024,455 | 5/1977 | Yarrow et al. | 321/29 |
| 4,035,712 | 7/1977 | Yarrow et al. | 322/24 |
| 4,115,729 | 9/1978 | Young et al. | 322/86 |
| 4,375,661 | 3/1983 | Savic | 361/91 |
| 4,392,193 | 7/1983 | Frola | 363/128 |
| 4,911,609 | 3/1990 | Anderson et al. | 415/174.2 |
| 5,237,140 | 8/1993 | Akazawa et al. . | |
| 5,561,978 | 10/1996 | Buschur | 60/424 |
| 5,633,792 | 5/1997 | Massey | 363/109 |
| 5,644,969 | 7/1997 | Leu et al. | 92/60.5 |
| 5,687,568 | 11/1997 | Buschur | 60/424 |
| 5,871,335 | 2/1999 | Bartlett | 416/244 R |

FOREIGN PATENT DOCUMENTS

| 30-9363 | 12/1955 | Japan . |
| 5-335158 | 12/1993 | Japan . |
| 8-126434 | 5/1996 | Japan . |
| 52-91103 | 8/1997 | Japan . |

*Primary Examiner*—Paul Ip
*Attorney, Agent, or Firm*—Burns, Doane, Swecker & Mathis, L.L.P.

[57] ABSTRACT

Disclosed is a rotatable inverter. The rotatable inverter comprises a rotatable inverting means for inverting a DC power source to an AC power source by means of a rotational force, and a transformer which receives the AC power source inverted by the rotatable inverting means and outputs a predetermined higher voltage. The rotatable inverting means comprises a motor generating the rotational force, a commutator driven by the motor and a plurality of brushes which are respectively contacted with the outer surface of the commutator. The commutator comprises a cylindrical body made of an insulating material, and conductive parts which are divided into an even-number by non-conductive parts, respectively, having a desired width. Further, it is preferable that the cooling fan is coupled to the motor along with the commutator. Therefore, the manufacturing cost is lowered, the attrition rate of the current is lowered, the energy lost by heat is decreased, the size of the microwave oven can be smaller, and the output frequency from the rotatable inverter can be controlled to be kept constant and the microwaves are also more stably radiated.

19 Claims, 9 Drawing Sheets

ROTATABLE INVERTER

BACKGROUND OF THE INVENTION

1. Field of the Invention

The present invention relates to a microwave oven, and more particularly to a rotatable inverter for inverting a DC power source into an AC power source.

2. Description of the Prior Art

Generally, an inverter is an apparatus for inverting a DC power source into an AC power source. A Conventional relay or a semiconductor device has been provided in the inverter. Recently, the semiconductor device such as a thyristor is most commonly employed.

FIG. 1 is a circuit diagram of a conventional inverter employing the semiconductor device. As shown in FIG. 1, the circuit of the conventional inverter employing the semiconductor device is comprised of a DC power source, a trigger circuit 10, a plurality of thyristors th1 and th2, a condenser C1 and a transformer 20. The plurality of thyristors th1 and th2 are switched on/off by a switching operation of the trigger circuit 10, and a current in the primary coil 21 of the transformer 20 is thus outputted in turn, thereby generating the AC power source having a desired voltage in a secondary coil 22.

The inverter employing the semiconductor device is connected to household electric appliances such as a microwave oven so as to supply an AC power source to the household electric appliances. Therefore, these household electric appliances can be used even in the open-air or on a ship, in an aircraft or any other vehicles where the AC power source is not available. Here, the microwave oven is an apparatus for cooking food by using microwaves. The microwave oven is provided with a high voltage transformer and a magnetron. The high voltage transformer serves to step up the AC power source supplied from the inverter to a high voltage of about 2,000 V. The magnetron is driven by the high voltage and radiates microwaves of a desired frequency. The microwaves vibrate molecules of moisture contained within the food. Therefore, the food is cooked by the frictional heat generated by the vibration of the moisture molecules.

However, in this type of AC/DC microwave oven provided with the inverter employing the semiconductor device, there is a problem. That is, since it is necessary to provide a plurality of expensive semiconductor devices for the inverter in order to output a desired high voltage for the magnetron, the manufacturing cost is increased.

In the above conventional AC/DC microwave oven, there is another problem that the life span of a battery which supplies the DC power source is short, since the attrition rate of the current by the semiconductor device is very high.

In the above conventional AC/DC microwave oven, there is another problem that, since the semiconductor device generates excessive heat, energy loss by the heat is increased.

In the above conventional AC/DC microwave oven, there is a further problem that, since the size of the cooling fins is increased to cool the semiconductor device, the size of the microwave oven has also to be increased.

SUMMARY OF THE INVENTION

The present invention has been designed to overcome the above problems, and accordingly, it is an object of the present invention to provide a rotatable inverter in which the manufacturing cost is lowered.

Another object of the present invention is to provide a rotatable inverter in which the attrition rate of the current by the semiconductor device is lowered and the life span of the battery is much longer.

Yet another object of the present invention is to provide a rotatable inverter in which energy loss by heat is lowered.

A further object of the present invention is to provide a rotatable inverter of which the size is smaller, thereby facilitating the handling of the rotatable inverter.

The above object is accomplished by the rotatable inverter according to the present invention comprising a rotatable inverting means for inverting a DC power source to an AC power source by means of a rotational force, and a transformer which receives the AC power source inverted by the rotatable inverting means and outputs a predetermined, higher voltage. The rotatable inverting means comprises a motor generating the rotational force, a commutator driven by the motor and a plurality of brushes which are respectively contacted with the outer surface of the commutator. The commutator comprises a cylindrical body made of an insulating material, and conductive parts which are divided into an even-number by non-conductive parts, respectively, having a desired width, whereby two brushes, which are adjacent to each other, are simultaneously contacted with one side of the conductive parts. Each of the non-conductive parts has a width which is wider than an end of the brush or which is the same as the end of the brush. The rotatable inverting means further comprises a power switch which connects or disconnects the DC power source with the motor and brushes. One pair of the brushes which are opposite each other are connected through the power switch to the DC power source, and another pair of the brushes which are opposite each other is connected to the side of the transformer. The motor is connected in parallel with the pair of brushes which are connected through the power switch to the DC power source. The power switch is connected in parallel with a condenser. Between the respective brushes, which are adjacent to each other, is respectively connected diodes for preventing a backward voltage flow. The transformer comprises a primary coil to which the AC power source inverted by the rotatable inverting means is inputted, and a secondary coil which outputs the AC power source induced from the primary coil, the primary coil being made of a plate-type coil having a larger cross-sectional surface than that of an usual coil.

Another object of the present invention is accomplished by the rotatable inverter according to the present invention, comprising a motor which is driven by a DC power source and generates a rotational force, a commutator which has a cylindrical body made of an insulating material, and conductive parts which are divided into two parts by nonconductive parts, respectively, having a desired width, a plurality of brushes which are respectively contacted with an outer surface of the commutator, one pair of brushes, which are opposite each other, receiving the DC power source, and another pair of the brushes, which are opposite each other, outputting the AC power source, and a transformer which receives the AC power source from the brushes and outputs a predetermined, higher voltage. Each of the non-conductive parts has a non-conductive groove which is formed on at least one end of the non-conductive part which is opposite to the conductive, the non-conductive groove having a predetermined width. Each of the non-conductive parts has a width which is wider than an end of the brush or which is the same as the end of the brush.

Yet another object of the present invention is accomplished by the rotatable inverter according to the present invention, comprising a motor which is driven by a DC power source and generates a rotational force, a commutator which has a cylindrical body made of an insulating material, and conductive parts which are divided into an even-number of parts by non-conductive parts, respectively, having a desired width, and plates which are, respectively, fixed to the side ends of the cylindrical body, each of the conductive parts having a extended portion which is extended to the side ends of the cylindrical body, and the extended portion having a predetermined length, a plurality of brushes which are respectively contacted with the outer surface of the commutator, one pair of brushes, which are opposite each other, receiving the DC power source, and another pair of the brushes, which are opposite each other, outputting the AC power source, and a transformer which receives the AC power source from the brushes and outputs a predetermined, higher voltage. Each plate is formed with a plurality of contacting pieces which are outwardly extended from the outer circumference of the plates and which are alternatively contacted with each extended portion. Each of the plates is made of a conductive material. Each of the non-conductive parts has a non-conductive groove which is formed on at least one end of the non-conductive part which is opposite to the conductive, the non-conductive groove having a predetermined width. Each of the non-conductive parts has a width which is wider than an end of the brushes, or which is the same as the end of the brush.

Yet another object of the present invention is accomplished by the rotatable inverter according to the present invention, comprising a motor which is driven by a DC power source and generates a rotational force, a cooling fan rotated by the motor, a commutator rotated by the motor, a plurality of brushes which are respectively contacted with the outer surface of the commutator, one pair of brushes, which are opposite each other, receiving the DC power source, and another pair of brushes, which are opposite each other, outputting the AC power source, and a transformer which receives the AC power source from the brushes and outputs a predetermined, higher voltage. The commutator comprises a cylindrical body made of an insulating material, and conductive parts which are divided into an even-number by non-conductive parts, respectively, having a desired width, whereby two brushes, which are adjacent to each other, are simultaneously contacted with one side of the conductive parts. The cooling fan is coupled to the motor along with the commutator.

Therefore, according to the present invention, the manufacturing cost is lowered, the attrition rate of the current is lowered, the energy loss by heat is decreased, and the size of the rotatable inverter can be smaller.

BRIEF DESCRIPTION OF THE DRAWINGS

The above objects and advantages will be more apparent by describing the present invention with reference to the accompanied reference drawings, in which.

DETAILED DESCRIPTION OF THE PREFERRED EMBODIMENT

Figure 1:
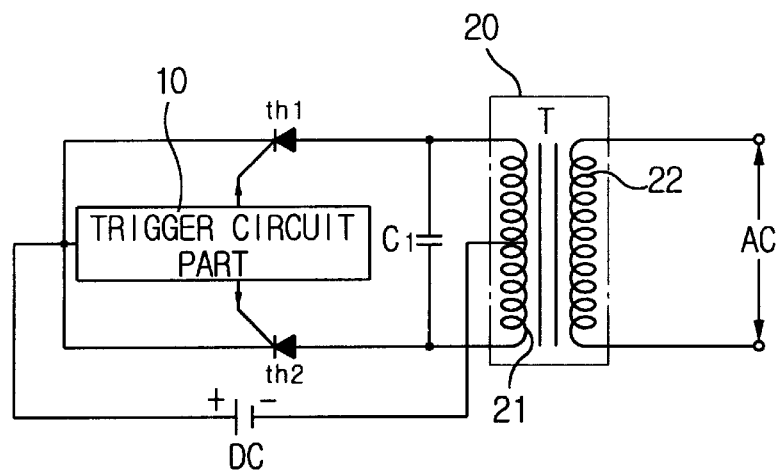
FIG. 1 is a circuit diagram of a conventional rotatable inverter employing a semiconductor device.
Figure 2:
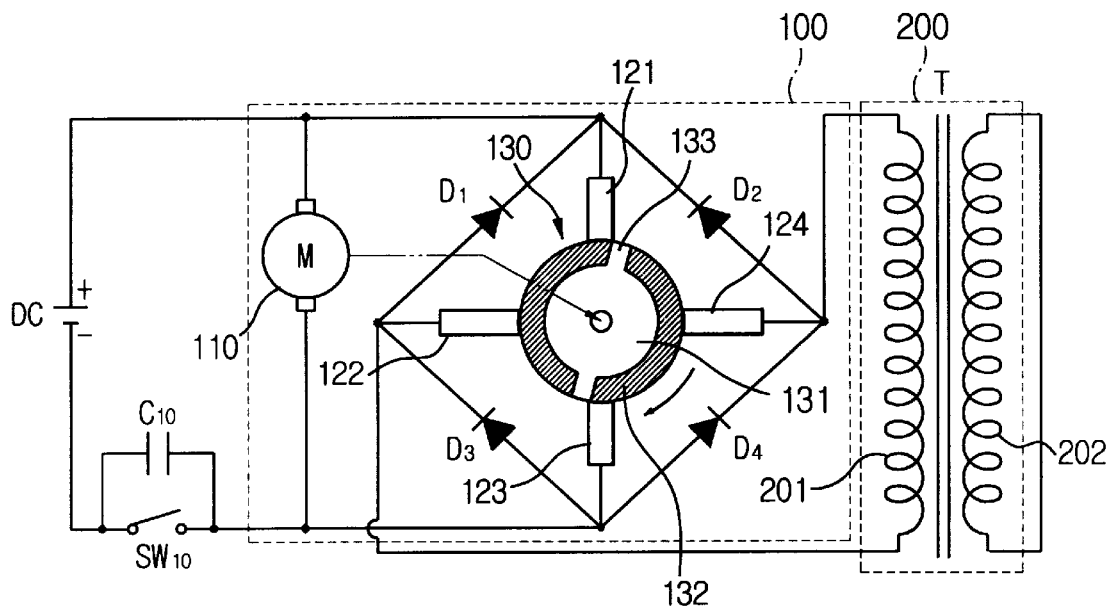
FIG. 2 is a circuit diagram of a rotatable inverter according to the first preferred embodiment of the present invention.

FIG. 2 is a circuit diagram of a rotatable inverter according to the first preferred embodiment of the present invention.

In FIG. 2, the reference numeral 100 denotes a rotatable inverting means, 110 is a motor, 121 to 124 are brushes, 130 is a commutator, 200 is a transformer. The rotatable inverting means 100 comprises the commutator 130, the brushes 121, 122, 123, 124, and the motor 110. Each of the brushes 121, 122, 123, 124 is contacted with the outer face of the commutator 130. The commutator 130 is rotated by the motor 110. The rotatable inverting means 100 inverts a DC power source into an AC power source by the rotation of the commutator 130. Here, one pair of brushes 121 and 123 which are opposite each other are connected to the DC power source, and the other pair of brushes 122 and 124 which are opposite each other are connected to the primary coil 201 of the transformer 200. Each of the diodes for preventing a backward voltage flow D1, D2, D3, D4 are respectively connected between the respective brushes 121, 122, 123, 124, which are adjacent to each other. The motor 110 is connected to the DC power source in parallel with the pair of brushes 121 and 123. Therefore, the DC power source is supplied to the brushes 121 and 123 and the motor 110 through the power switch SW10. A condenser C10 is connected with the power switch SW10 in parallel. The commutator 130 comprises a cylindrical body 131 and conductive parts 132 which are formed on the outer surface of the cylindrical body 131. The conductive parts 132 are respectively divided into two parts by non-conductive parts 133 having a predetermined width. The transformer 200 receives the AC power source inverted by the rotatable inverting means 100, and steps up or down the AC power source to a AC power source having a desired voltage. This AC power source can be directly supplied to a household electric appliance such as a microwave oven. The transformer 200 is provided with a secondary coil 202 along with the primary coil 201. Here, the primary coil 201 is wound on the input part of the transformer 200, and receives the AC power source inverted by the rotatable inverting means 100. The secondary coil 202 is wound on the output part of the transformer 200.

Figure 3:
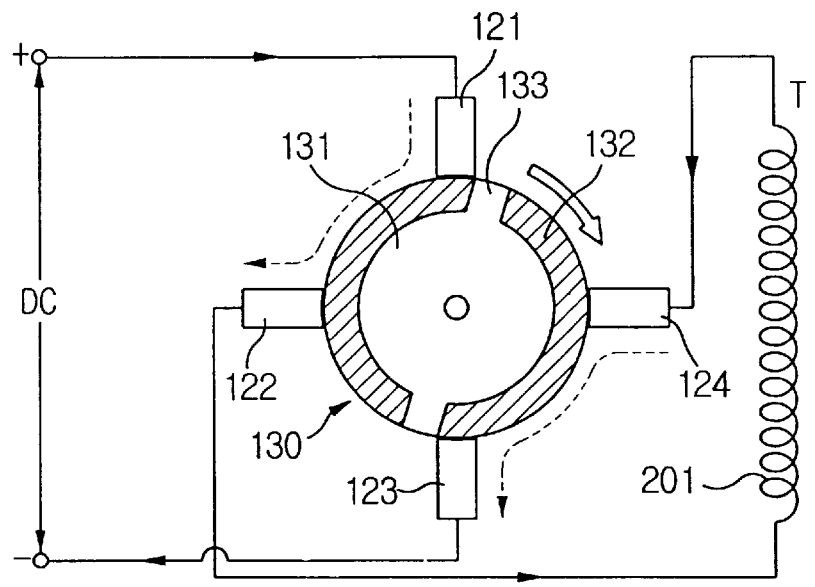
FIGS. 3 and 4 are views showing the operations of how the DC current is inverted into AC current according to the present invention.
Figure 4:
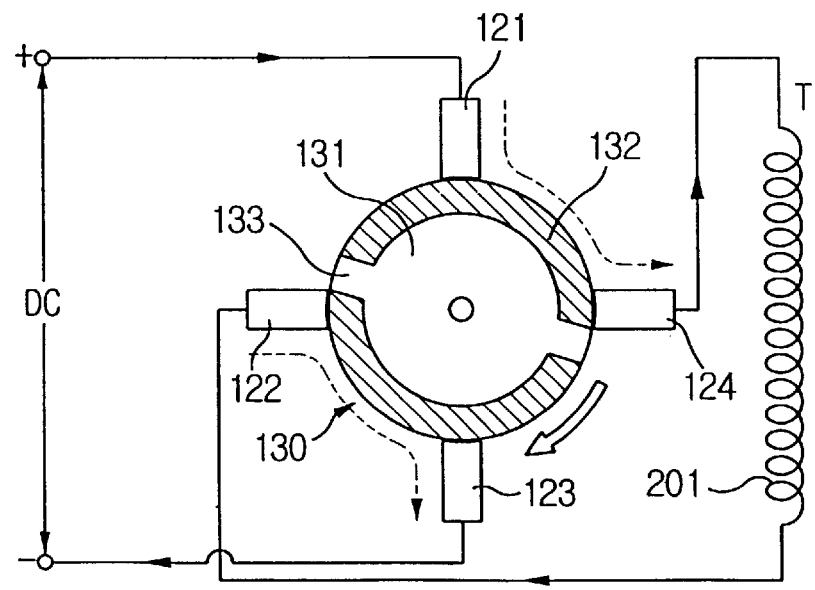
Figure 5:
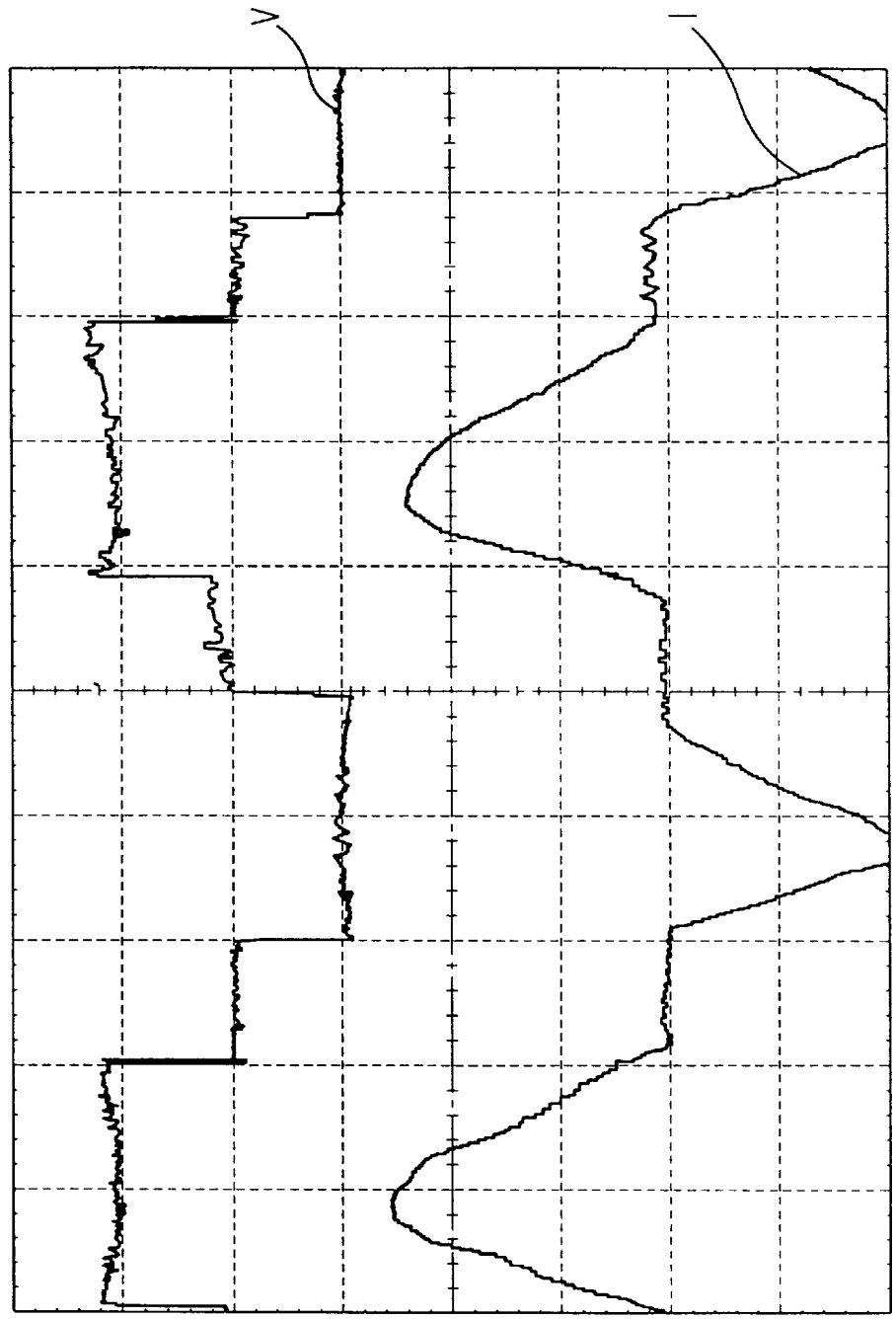
FIG. 5 is a view showing waveforms of a current and a voltage outputted by the inverting operations in FIGS. 3 and 4.

FIGS. 3 and 4 are views showing the operations of how the DC current is inverted into AC current according to the present invention, and FIG. 5 is a view showing waveforms of a current and a voltage outputted by the inverting operations in FIGS. 3 and 4.

As shown in FIG. 3, a current is inputted from a positive terminal of the DC power source to the upper brush 121, and flows through the conductive part 132 of the commutator 132 and the left brush 122 from a lower portion of the primary coil 201 of the transformer 200 toward an upper portion thereof. Further, the current is inputted to the right brush 124 and circulated through the conductive part 132 and the lower brush 123 to a negative terminal of the DC power source. As shown in FIG. 4, the current from the positive terminal of the DC power source is inputted to the upper brush 121 and flows through the conductive part 132 of the commutator 130 and the right brush 124 from the upper portion of the primary coil 201 of the transformer 200 toward the lower portion thereof, while the commutator 130 is rotated at a desired angle, for example, at 90 degrees. Further, the current is inputted to the left brush 122 and circulated through the conductive part 132 and the lower brush 123 to a negative terminal of the DC power source. As described above, the current direction in the primary coil 201 of the transformer 200 is changed to up and down in turns, thereby generating the AC power source of a desired frequency. The waveforms of the current (I) and the voltage (V) of this AC power source, which are displayed on a oscilloscope, are described in FIG. 5.

Figure 6:
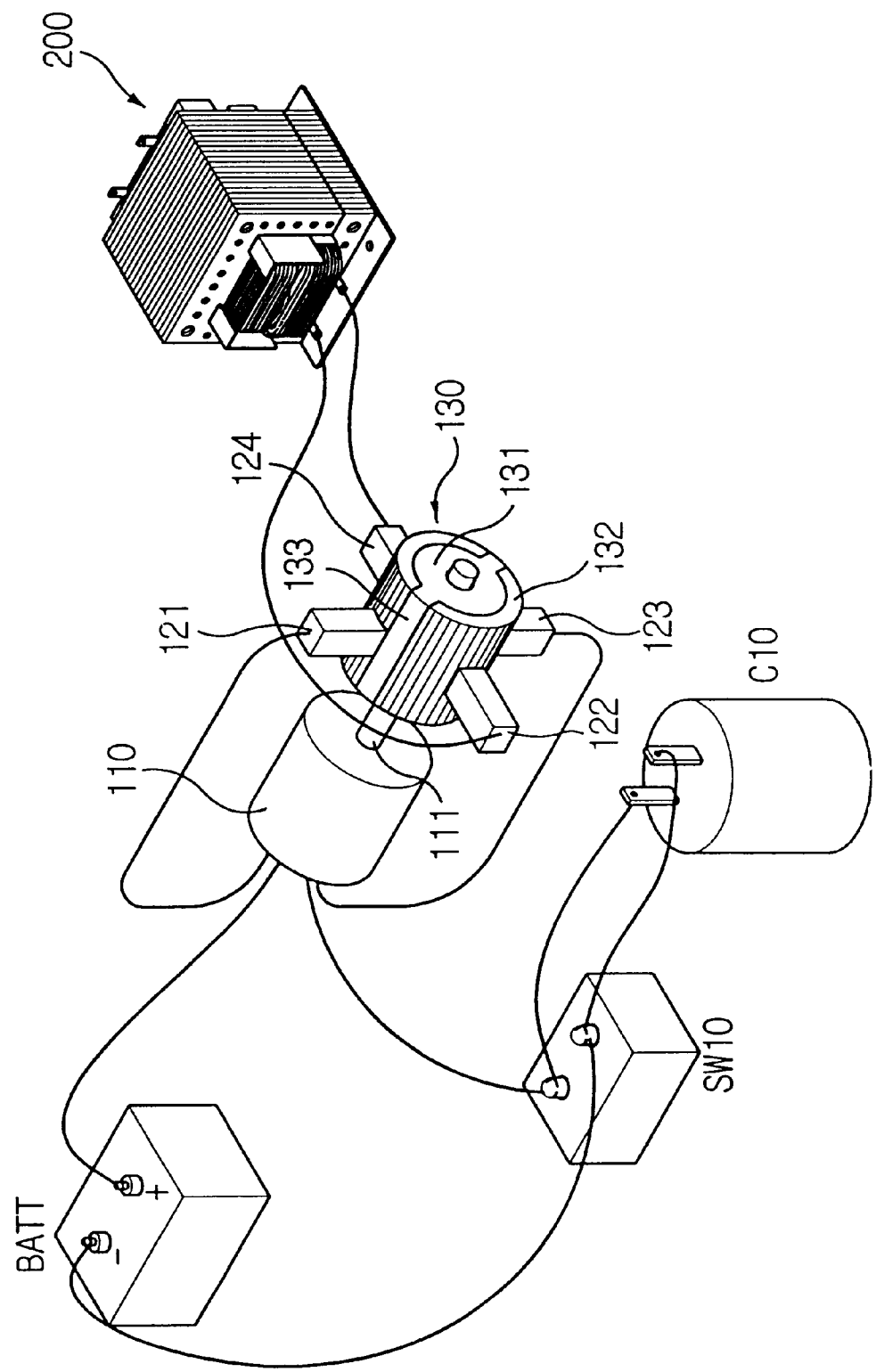
FIG. 6 is a schematic view showing the connected state of the component elements of the present invention.

FIG. 6 is a schematic view showing the connected state of the component elements of the present invention. In FIG. 6, the reference numeral 110 is a motor, 111 is a rotary shaft of the motor 110, and 121 to 124 are brushes, 130 is a commutator, 200 is a transformer, SW10 si a power switch, C10 is a condenser, and BATT is a battery. The commutator 130 is coupled to the rotary shaft 111 of the motor 110 to be rotated by a rotational force of the motor 110. The commutator 130 comprises a cylindrical body 131 and conductive parts 132 which are formed on the outer surface of the cylindrical body 131. Each of the conductive parts 133 is divided into two parts by non-conductive parts 133 having a predetermined width. Here, it is preferable that the non-conductive part 133 has a width which is larger than that of each brush 121, 122, 123, 124, or which is the same as that. A battery of 12 V or 24 V is employed as a means for supplying a DC power source.

Figure 7:
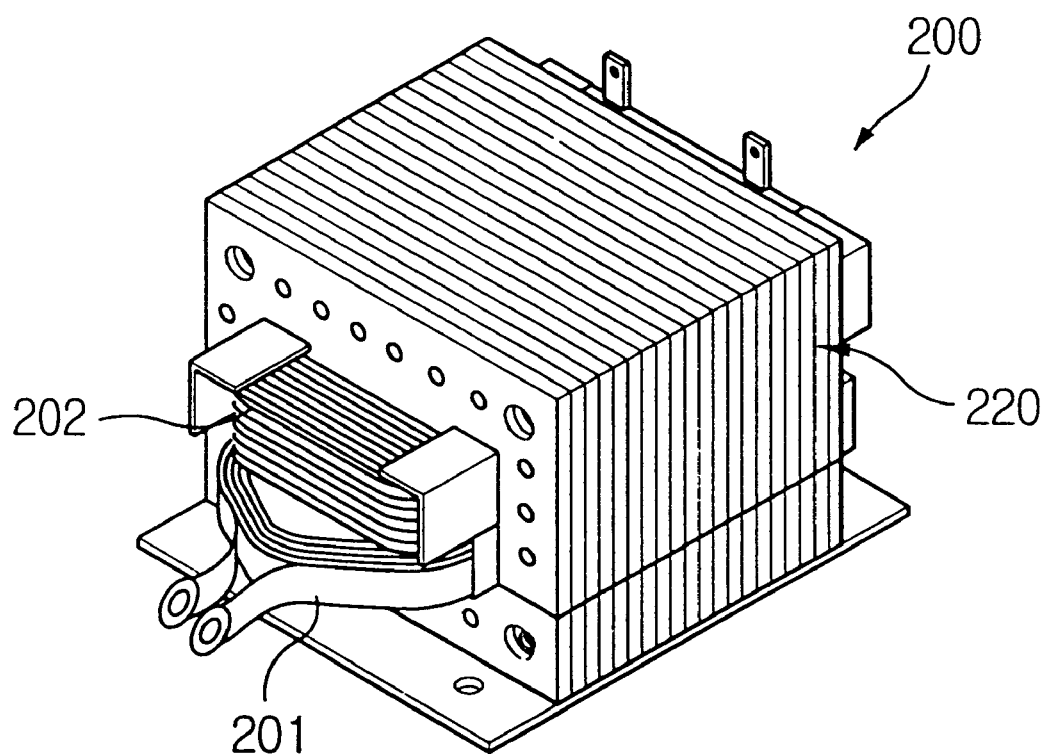
FIG. 7 is a perspective view showing a transformer according to the present invention.

FIG. 7 is a perspective view showing a transformer according to the present invention. In FIG. 7, the reference numeral 210 denotes a core, 201 is a primary coil, 202 is a secondary coil. The AC power source inverted by the rotatable inverting means 100 is inputted to the primary coil 201. It is preferable that the primary coil 201 is made of a plate-type coil having a larger cross-sectional surface than an usual coil so as to be operated to the extent of about 50 to 1,000 Hz.

Figure 8:
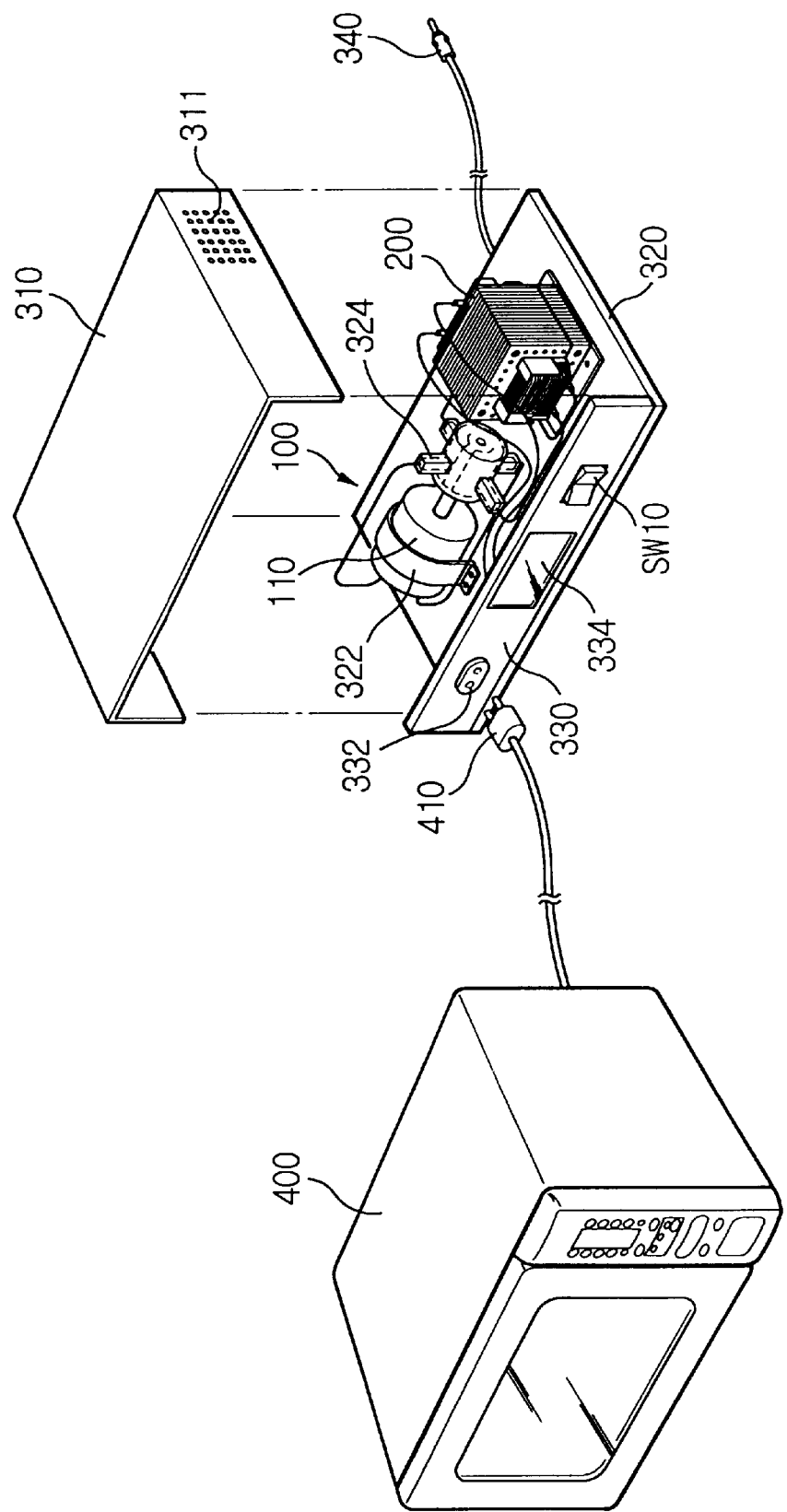
FIG. 8 is a perspective view showing the connecting state of a microwave oven and the rotatable inverter of the present invention.

FIG. 8 is a perspective view showing the connecting state of a microwave oven and the rotatable inverter of the present invention. In FIG. 8, the reference numeral 310 is an upper case, 320 is a lower case, 330 is a front panel and 340 is a jack. On the lower case 320 are disposed the rotatable inverting means 100 and the transformer 200. The rotatable inverting means 100 comprises the motor 110, the brushes 121, 122, 123, 124, and the commutator 130. The motor 110 is fixedly mounted on the lower case 320 by a bracket 322, and the brushes 121, 122, 123, 124, and the commutator 130 are fixedly mounted on the lower case 320 by a housing 324. A ventilating hole 311 is formed on a part of the upper case 310. On the front panel 330 is provided an AC output terminal 332, a displaying part 334 and a power switch SW10. A plug 410 of the microwave oven 400 is connected to the AC output terminal 332 so that the AC power source is supplied to the microwave oven 400. The rotatable inverting means 100 receives the DC power source through the jack 340 from a battery for a vehicle (not shown). The rotatable inverter according to the present invention uses an outside battery. However, it is also possible to use the battery within the rotatable inverter.

The operation of the rotatable inverter as constructed above, according to the first embodiment of the present invention, will be explained in detail by the accompanied FIGS. 2 to 8.

First of all, a household appliance to be used is connected to the rotatable inverter of the present invention. For example, as shown in FIG. 8, the plug 410 of the microwave oven 400 is connected to the AC output terminal 332. In this situation, when the power switch SW10 is switched on by a user, the DC power source of 12 V or 24 V from the battery BATT is supplied through the power switch SW10 to the motor 110 and the upper brush 121 of the rotatable inverting means 100. Therefore, the commutator 130 is rotated by the rotary shaft 111 of the motor 110. The conductive parts 132 are thus contacted with the respective brushes 121, 122, 123, 124 in turn, whereby the DC power source is inverted to an AC power source.

That is, the current of the DC power source supplied from the positive terminal of the battery BATT is inputted through the upper brush 121 in FIG. 3 to the commutator 130. The current thus flows through the conductive part 132 toward the left brush 122, and is inputted from the lower portion of the primary coil 201 of the transformer 200 to the upper portion thereof. And then, the current is circulated through the right brush 124, the conductive part 132 and the lower brush 123 to the negative terminal of the battery BATT. The DC power source supplied from the positive terminal of the battery BATT is inputted through the upper brush 121, the conductive part 132 and the right brush 124 from the upper portion of the primary coil 201 toward the lower portion thereof as shown in FIG. 4, while the commutator 130 is rotated at a desired angle, for example, at 90 degrees. After that, the current is circulated through the left brush 122, the conductive part 132 and the lower brush 123 to a negative terminal of the battery. Therefore, in every one rotation (360 degrees) of the motor 110, the current direction in the primary coil 201 of the transformer 200 is changed to up and down in turns, thereby generating the AC power of a desired frequency. Here, the frequency of the AC power source in the primary coil 201 of the transformer 200 is determined according to the rotation speed of the motor 110. The transformer 200 induces the AC power supplied to the primary coil 201 into the secondary coils 202 of the transformer 200. The secondary coil 202 steps up the AC input power to an AC output power source having a desired voltage proportional to the turn ratio. The raised power is supplied to the household appliance such as a microwave oven, whereby it is possible to use the household appliance even in the open-air or on a ship, in an aircraft or any other vehicles where the AC power source is not available. According to the rotatable inverter of the present invention, since the number of the constructive parts thereof may be reduced, the manufacturing cost is lowered. And since the semiconductor device is not used in the above microwave oven, the attrition rate of the current and the energy lost by heat are also lowered. The size of the microwave oven is also decreased by removing the cooling fins.

Figure 9A:
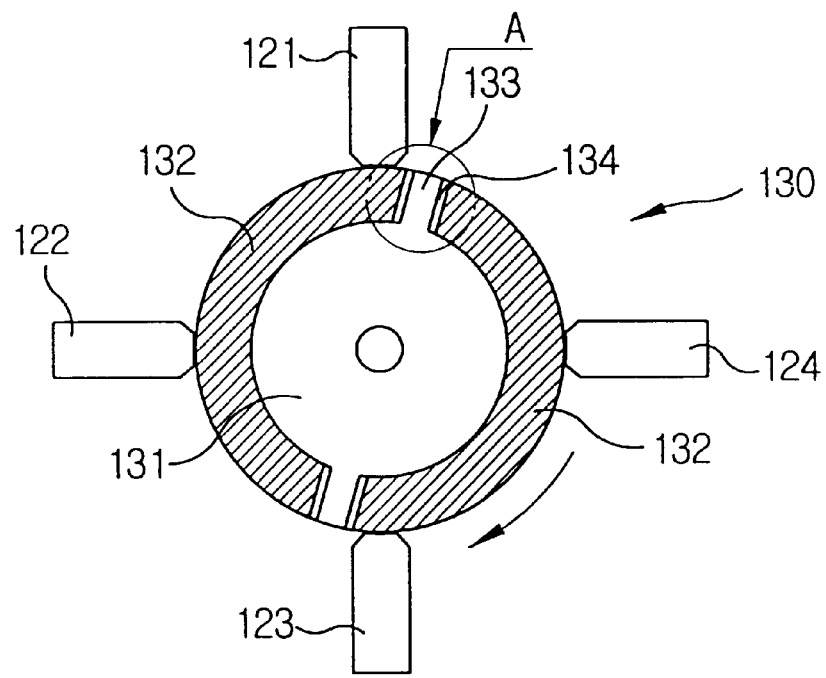
FIG. 9A is a side view of a commutator divided into two parts according to the second preferred embodiment of the present invention.
Figure 9B:
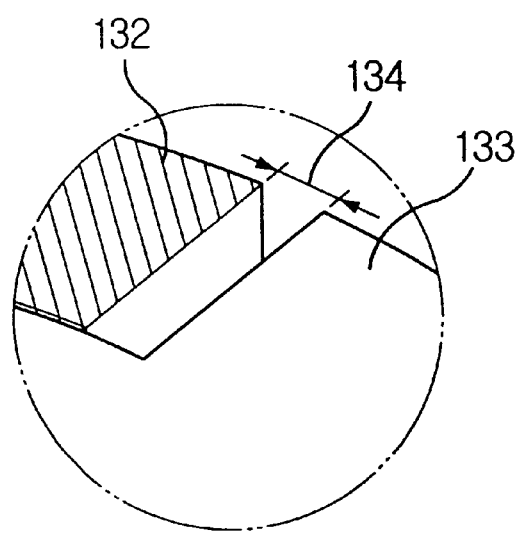
FIG. 9B is an enlarged detail of the part "A" of FIG. 9A.

FIG. 9A is a side view of a commutator divided into two parts according to the second preferred embodiment of the present invention, and FIG. 9B is an enlarged detail of the part "A" of FIG. 9A. In FIGS. 9A and 9B, the commutator 130 comprises a cylindrical body 131 and conductive parts 132 which are formed on the outer surface of the cylindrical body 131. The conductive parts 132 are respectively divided into two parts by non-conductive parts 133 having a predetermined width. A non-conductive groove 134 having a predetermined width is formed on at least one end of the non-conductive part 133 which is opposite to the conductive 132. The non-conductive groove 134 has the width of about 0.1–1 mm, preferably 0.4–0.7 mm. Further, the non-conductive parts 133 have a width which is wider than an end of the brushes 121, 122, 123, 124, or which is the same as the end of the brushes. Therefore, in every one rotation (360 degrees) of the motor 110, the current direction in the primary coil 201 of the transformer 200 is changed twice to up and down in turns by the conductive parts 132 which are divided into two parts, thereby generating the AC power of a desired frequency. Meanwhile, there is a friction between the conductive and non-conductive parts 132 and 133 of the commutator 130 and the brushes 121, 122, 123, 124. Here, since the conductive parts 132 are made of copper having excellent conductivity, the conductive parts 132 may be expanded to the non-conductive parts 133 by frictional heat. If the conductive parts 132 are expanded to the non-conductive parts 133, it is apprehended that each conductive part 132 is shorted by the brushes 121, 122, 123, 124. However, according to the present invention, since the non-conductive groove 134 having a predetermined width is formed on the end thereof, the conductive parts 132 are prevented from being expanded to the non-conductive part 133 by frictional heat and being shorted by the brushes 121, 122, 123, 124.

Figure 10:
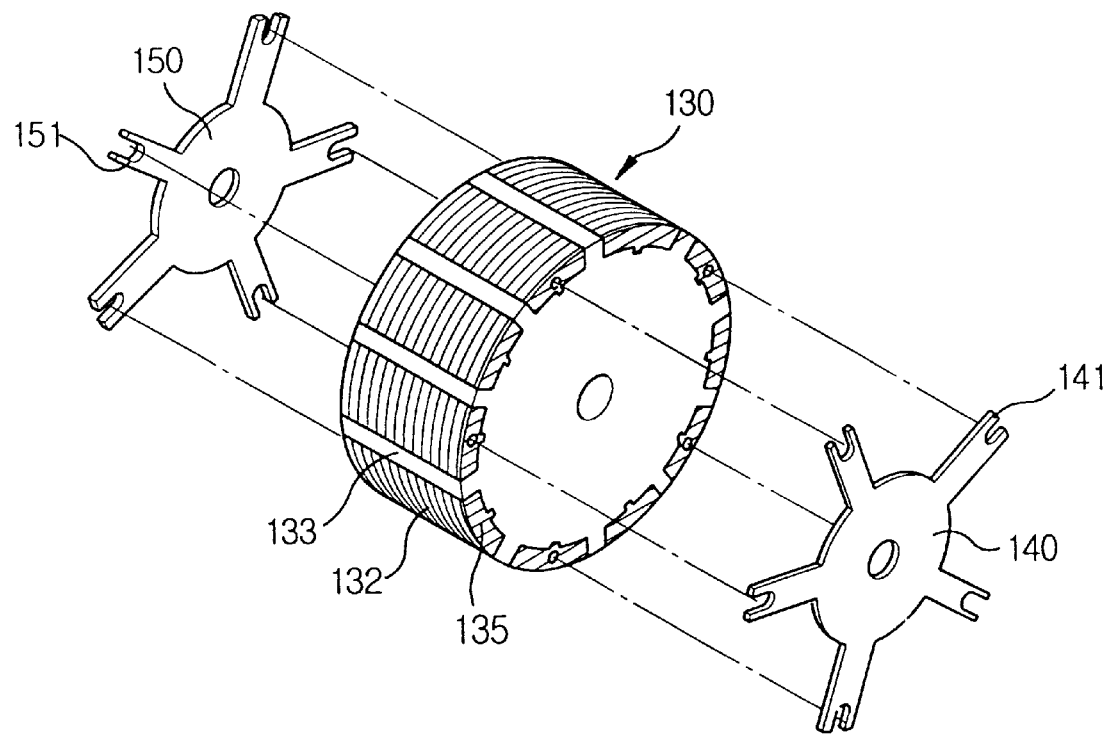
FIG. 10 is a exploded perspective view of a commutator divided into a plurality of parts according to the third preferred embodiment of the present invention.
Figure 11:
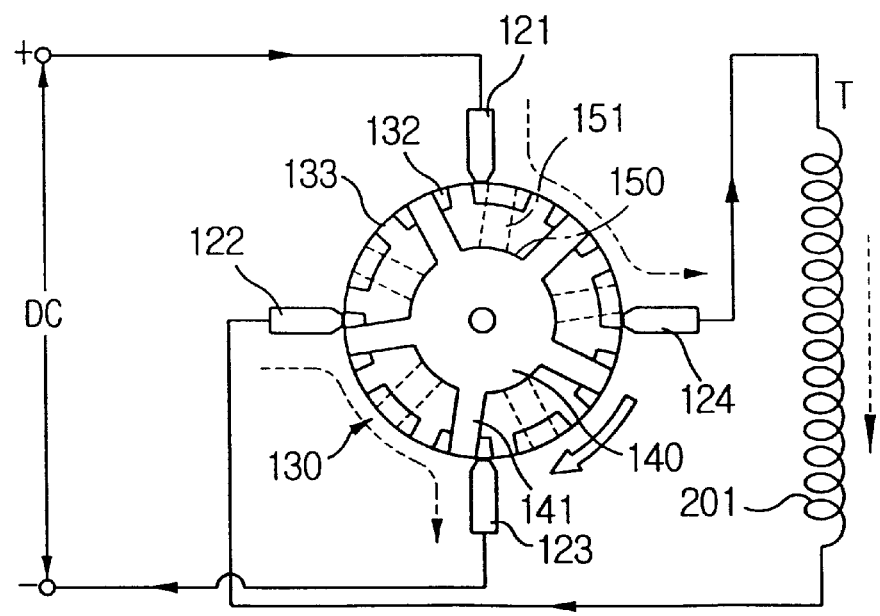
FIG. 11 is a view showing the operation of the commutator in FIG. 10.

FIG. 10 is a exploded perspective view of a commutator divided into a plurality of parts according to the third preferred embodiment of the present invention, and FIG. 11 is a view showing the operation of the commutator in FIG. 10. In FIGS. 10 and 11, the commutator 130 comprises a cylindrical body 131 and conductive parts 132 which are formed on the outer surface of the cylindrical body 131. The conductive parts 132 are respectively divided into an even-number of parts, e.g. 10 parts by non-conductive parts 133 having a predetermined width. Each of the conductive parts 132 has an extended portion 135 which is extended to the side ends of the cylindrical body 131, and the extended portion 135 has a predetermined length. The commutator 130 further comprises plates 140 and 150 which are, respectively, fixed to the side ends of the cylindrical body 131. Each plate 140 and 150 is formed with a plurality of contacting pieces 141 and 151 which are outwardly extended from the outer circumference of the plates 140 and 150 and which are alternatively contacted with each extended portion 135. The plates 140 and 150 are made of a conductive material. A non-conductive groove 134 having a predetermined width is formed on at least one end of the non-conductive parst 133 which is opposite to the conductive 132. Further, the non-conductive parts 133 have a width which is wider than one end of the brushes 121, 122, 123, 124, or which is the same as the end of the brushes.

Therefore, as shown in FIG. 11, the current of the DC power source supplied from the positive terminal of the battery BATT is inputted through the upper brush 121, the conductive parts 132, each of the contacting pieces 151 of the plate 150 which is contacted with the extended parts 135, and the right brush 124 from the upper portion of the primary coil 201 of the transformer 200 to the lower portion thereof. And then, the current is circulated through the left brush 122, the conductive part 132, each of the contacting pieces 141 of the plate 140 which is contacted with the extended parts 135 and the lower brush 123 to the negative terminal of the battery BATT. Therefore, in every one rotation (360 degrees) of the motor 110, the current direction in the primary coil 201 of the transformer 200 is changed to up and down in turns, thereby generating the AC power of a desired frequency. Here, the frequency of the AC power source in the primary coil 201 of the transformer 200 is determined according to the rotational speed of the motor 110. Therefore, in order to increase or decrease the frequency of the AC power source, the rotational speed of the motor 110 has to be controlled. However, according to the present invention, since the current direction in the primary coil 201 of the transformer 200 is changed ten times into up and down in turn during every one rotation (360 degrees) of the motor 110, the AC power of a higher frequency can be generated. Therefore, it is possible to generate the AC power of the higher frequency without increasing the rotational speed of the motor 110.

Figure 12:
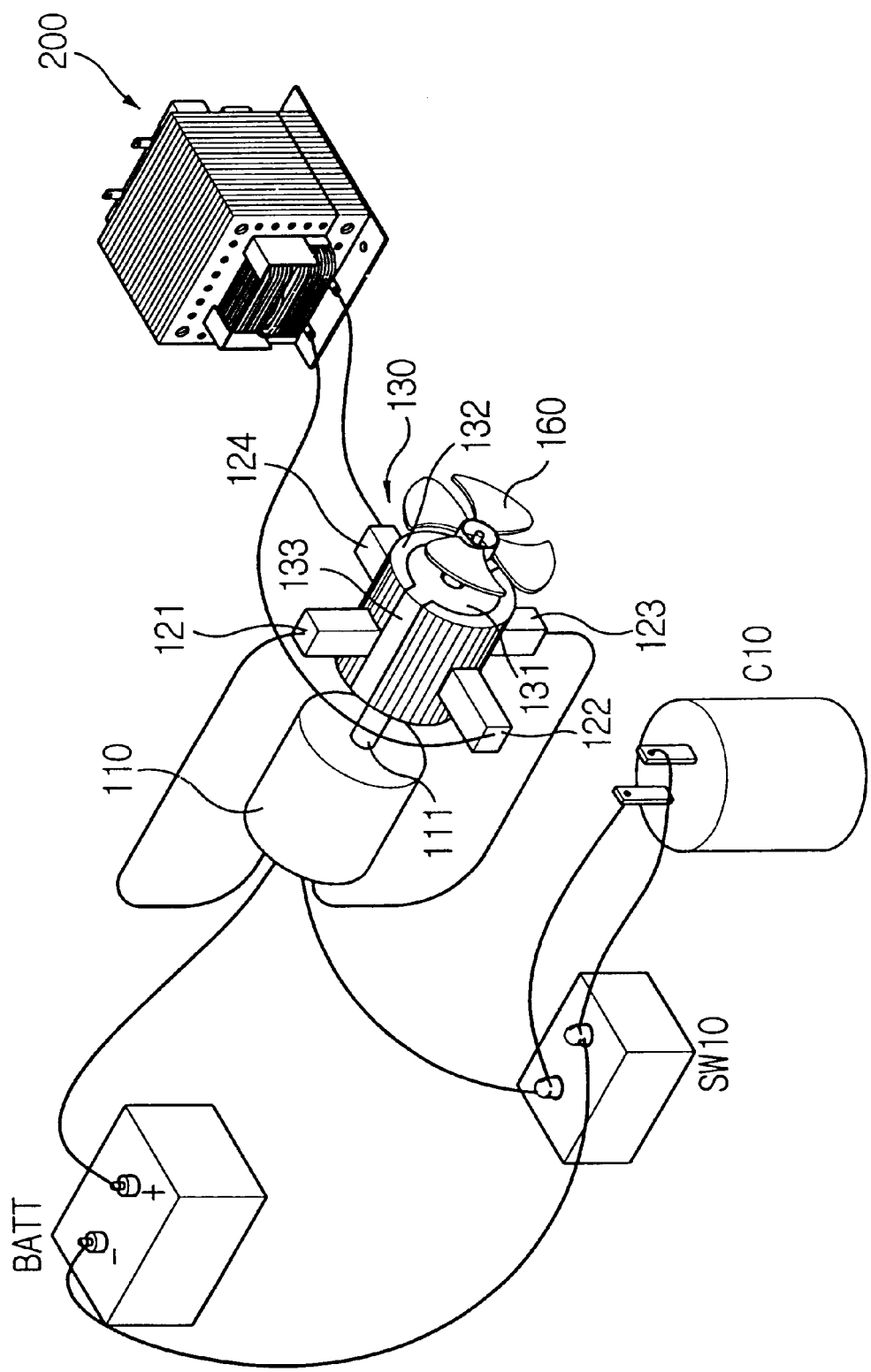
FIG. 12 is a schematic view showing the connected state of the component elements according to the fourth preferred embodiment of the present invention.

FIG. 12 is a schematic view showing the connected state of the component elements according to the fourth preferred embodiment of the present invention. In FIG. 12, there is provided a motor 110 which is driven by the DC power source and generates a rotational force, a cooling fan 160 rotated by the motor 110, and a commutator 130 rotated by the motor 110. Here, the cooling fan 160 and the commutator 130 are coupled to a rotary shaft 111 of the motor 110. Therefore, the commutator 130 is driven by the motor 110, thereby generating the AC power source. The cooling fan 160 is also driven by the motor 110, whereby the motor 110, the commutator 130 and the transformer 200 are cooled. Since the cooling fan 160 is driven by the rotational force of the rotary shaft 11, a separate power source for the cooling fan 160 is not necessary, whereby the manufacturing cost and the attrition rate of the current are lowered.

According to the rotatable inverter of the present invention, since the number of constructive parts thereof may be reduced, the manufacturing cost is lowered.

And, the life span of the battery which supplies the DC power source can be much longer, since the semiconductor device described in the prior art is not employed and the attrition rate of the current is very low.

Further, the energy loss by heat is decreased, since the semiconductor device described in the prior art is not employed.

Further, since the cooling fins employed in the prior art can be removed, the size of the microwave oven can be smaller.

Further, according to the present invention, the output frequency from the rotatable inverting means can be selectively controlled by the rotational speed of the motor and the number of the conductive parts.

Further, Since the cooling fan is directly coupled to the rotary shaft of the motor, the manufacturing cost and the attrition rate of the current are lowered.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A rotatable inverter comprising:
   a rotatable inverting means for inverting a DC power source to an AC power source by means of a rotational force, said rotatable inverting means further comprising:
   a motor generating the rotational force, a commutator driven by the motor and a plurality of brushes which respectively make contact with an outer surface of the commutator, wherein the commutator further comprises conductive parts which are divided into an even-number by non conductive parts, respectively, having a desired width, whereby two brushes, which are adjacent to each other, simultaneously make contact with one of the conductive parts; and a transformer which receives the AC power source inverted by the rotatable inverting means and outputs a predetermined voltage.

2. A rotatable inverter as claimed in claim 1, wherein each of the non-conductive parts has a width which is wider than an end of the brushes or which is the same width as the end of the brushes.

3. A rotatable inverter as claimed in claim 1, wherein the rotatable inverting means further comprises a power switch which connects or disconnects the DC power source with the motor and brushes.

4. A rotatable inverter as claimed in claim 3, wherein one pair of brushes which are opposite each other are connected through the power switch to the DC power source, and another pair of brushes which are opposite each other is connected to the side of the transformer.

5. A rotatable inverter as claimed in claim 4, wherein the motor is connected in parallel with the pair of brushes which is connected through the power switch to the DC power source.

6. A rotatable inverter as claimed in claim 3, wherein the power switch is connected in parallel with a condenser.

7. A rotatable inverter as claimed in claim 1, wherein between the respective brushes, which are adjacent to each other, are respectively connected diodes for preventing backward voltage flow.

8. A rotatable inverter as claimed in claim 1, wherein the transformer comprises a primary coil to which the AC power source inverted by the rotatable inverting means is inputted, and a secondary coil which outputs the AC power source induced from the primary coil.

9. A rotatable inverter comprising:

a motor which is driven by a DC power source and generates a rotational force;

a commutator which has a cylindrical body made of an insulating material, and conductive parts which are divided into two parts by non-conductive parts, respectively, having a desired width;

a plurality of brushes which are respectively contacted with the outer surface of the commutator, one pair of brushes, which are opposite each other, receiving the DC power source, and another pair of brushes, which are opposite each other, outputting the AC power source; and a transformer which receives the AC power source from the brushes and outputs a predetermined voltage.

10. A rotatable inverter as claimed in claim 9, wherein each of the non-conductive parts has a non-conductive groove which is formed on at least one end of the non-conductive parts which are opposite to the conductive parts, the non-conductive groove having a predetermined width.

11. A rotatable inverter as claimed in claim 10, wherein each of the non-conductive parts has a width which is wider than an end of the brushes or which is the same width as the end of the brushes.

12. A rotatable inverter comprising:

a motor which is driven by a DC power source and generates a rotational force;

a commutator which has a cylindrical body made of an insulating material, and conductive parts which are divided into an even-number of parts by non-conductive parts, respectively, having a desired width, and plates which are, respectively, fixed to the side ends of the cylindrical body, each of the conductive parts having an extended portion which is extended to the side ends of the cylindrical body, and the extended portion having a predetermined length;

a plurality of brushes which are respectively contacted with the outer surface of the commutator, one pair of brushes, which are opposite each other, receiving the DC power source, and another pair of the brushes, which are opposite each other, outputting the AC power source; and a transformer which receives the AC power source from the brushes and outputs a predetermined voltage.

13. A rotatable inverter as claimed in claim 12, wherein each plate is formed with a plurality of contacting pieces which are outwardly extended from the outer circumference of the plates and which are alternatively contacted with each extended portion.

14. A rotatable inverter as claimed in claim 13, wherein each of the plates is made of a conductive material.

15. A rotatable inverter as claimed in claim 12, wherein each of the non-conductive parts has a non-conductive groove which is formed on at least one end of the non-conductive parts which are opposite to the conductive parts, the non-conductive groove having a predetermined width.

16. A rotatable inverter as claimed in claim 15, wherein each of the non-conductive parts has a width which is wider than an end of the brushes or which is the same width as the end of the brushes.

17. A rotatable inverter comprising:

a motor which is driven by the DC power source and generates a rotational force;

a cooling fan rotated by the motor;

a commutator rotated by the motor;

a plurality of brushes which are respectively contacted with the outer surface of the commutator, one pair of the brushes, which are opposite each other, receiving the DC power source, and another pair of brushes, which are opposite each other, outputting the AC power source; and a transformer which receives the AC power source from the brushes and outputs a predetermined voltage.

18. A rotatable inverter as claimed in claim 17, wherein the commutator comprises a cylindrical body made of an insulating material, and conductive parts which are divided into an even-number by non-conductive parts, respectively, having a desired width, whereby two brushes, which are adjacent to each other, are simultaneously contacted with one side of the conductive parts.

19. A rotatable inverter claimed in claim 17, wherein the cooling fan is coupled to the motor along with the commutator.

* * * * *